C. PERRY.
Grain Winnower.
No. 103,922.
Patented June 7, 1870.
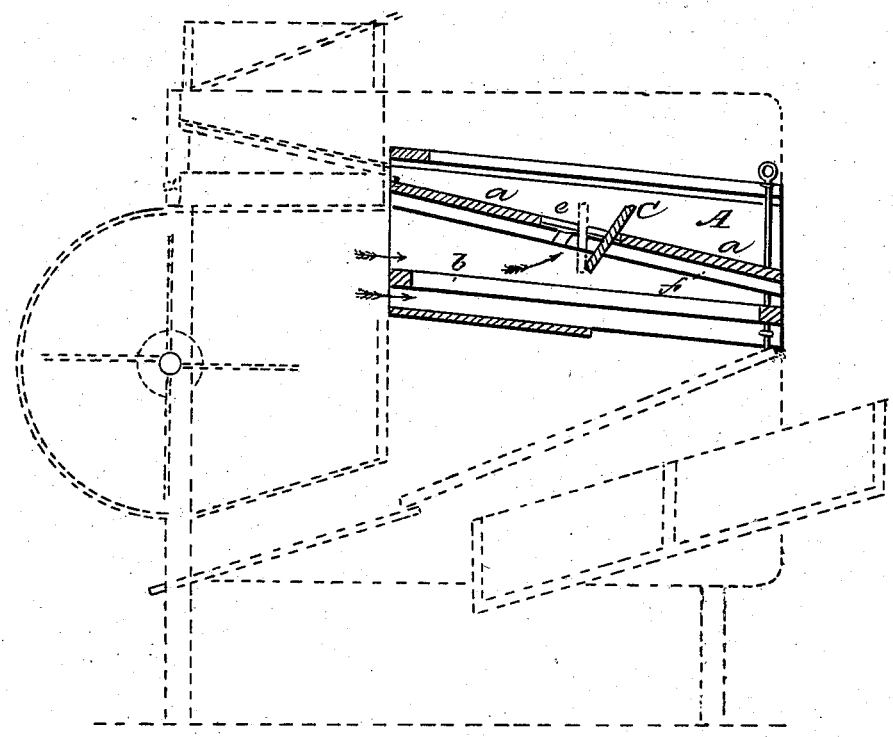
Witnesses:
Wm. S. Loughborough
F. H. Clement
Inventor:
Chauncey Perry

United States Patent Office.

CHAUNCEY PERRY, OF ROCHESTER, NEW YORK.

Letters Patent No. 103,922, dated June 7, 1870; antedated May 23, 1870.

IMPROVEMENT IN GRAIN-CLEANER.

The Schedule referred to in these Letters Patent and making part of the same.

*To all whom it may concern:*

Be it known that I, CHAUNCEY PERRY, of Rochester, in the county of Monroe and State of New York, have invented certain new and useful Improvements in Grain-Cleaners; and I do hereby declare that the following is a full, clear, and exact description thereof, reference being had to the accompanying drawing making part of this specification, in which the figure is a vertical section of my invention, showing the main portions of an ordinary fanning-mill in dotted lines.

The object and nature of my invention will be understood by reference to the specification and drawing, and to enable others to make and use the same, I will describe its construction and operation.

The shoe A is arranged in the usual manner, with a chess-board, $a$, to receive the grain from the hopper, and one or more screens, $b$, below.

At a suitable point in the chess-board $a$ I introduce an opening, $e$, running entirely across the shoe, with the exception of the thickness of the ribs $f$ at the side.

These ribs are secured to the chess-board, and are provided with slots $x$, cut across them at any desired angle.

The wind-board C is fitted to these slots, in any one of which it may be placed, and is made sufficiently wide to project some distance above the chess-board, and nearly down to the screen $b$ below it.

The opening $e$ may be made in the chess-board, in a screen, or between a chess-board and a screen, the two parts being held together by the ribs $f$.

The wind-board C may be made vertically adjustable by any suitable means, or it may be swung upon pivots, whereby its inclination can be easily varied, or it may have both of these adjustments.

The face next the fan may, if desirable, be made convex or concave.

The operation of my invention is as follows:

As the grain from the hopper arrives at the opening $e$, and falls through upon the screen, the blast from the fan meets it and removes all substances lighter than the grain, by carrying them against the wind-board C, and buoying them over its edge to the lower portion of the chess-board $a$, upon which they are conveyed to the rear of mill and discharged.

It is obvious that this allows the screens to perform their functions more perfectly and without clogging, while the action of the wind-board directs the grain to the forward portion of the screen $b$, thus utilizing its whole surface for sifting purposes.

The wind-board C also gathers and directs the blast upward as it passes through the shoe.

This device is particularly valuable for cleaning seed wheat, since all light matter, like cockle, chess, smut-balls, and imperfect grain, can be entirely removed.

My invention is easily attached to any grain-separator, by putting in the wind-board in the manner shown, and providing a removable or adjustable partition in the rear of the fan, to direct the blast through the upper portions of the shoe.

What I claim as my invention, and desire to secure by Letters Patent, is—

1. The opening $e$, in combination with the chess-board $a$ and wind-board C, for the purposes set forth.

2. The vertically and angular adjustable wind-board C, in combination with the chess-board $a$, for the purposes set forth.

Witnesses:            CHAUNCEY PERRY.
   WM. S. LOUGHBOROUGH,
   F. H. CLEMENT.